United States Patent
Mujtaba et al.

(10) Patent No.: US 9,154,201 B2
(45) Date of Patent: Oct. 6, 2015

(54) ADAPTATION TECHNIQUES IN MIMO

(71) Applicant: Intel Mobile Communications GmbH, Neubiberg (DE)

(72) Inventors: Syed Aon Mujtaba, Watchung, NJ (US); Xiaowen Wang, Bridgewater, NJ (US)

(73) Assignee: Intel Deutschland GmbH, Neubiberg (DE)

( * ) Notice: Subject to any disclaimer, the term of this patent is extended or adjusted under 35 U.S.C. 154(b) by 0 days.

(21) Appl. No.: 14/470,006

(22) Filed: Aug. 27, 2014

(65) Prior Publication Data

US 2015/0092895 A1 Apr. 2, 2015

Related U.S. Application Data

(63) Continuation of application No. 12/186,368, filed on Aug. 5, 2008, now Pat. No. 8,855,257.

(60) Provisional application No. 61/027,720, filed on Feb. 11, 2008.

(51) Int. Cl.

| | |
|---|---|
| *H04B 7/04* | (2006.01) |
| *H04L 1/00* | (2006.01) |
| *H04L 1/06* | (2006.01) |
| *H04B 7/08* | (2006.01) |
| *H04B 7/06* | (2006.01) |

(52) U.S. Cl.
CPC ............ *H04B 7/0413* (2013.01); *H04B 7/0417* (2013.01); *H04B 7/0888* (2013.01); *H04L 1/0003* (2013.01); *H04L 1/0009* (2013.01); *H04L 1/0017* (2013.01); *H04L 1/0054* (2013.01); *H04L 1/0625* (2013.01); *H04B 7/068* (2013.01); *H04B 7/0669* (2013.01)

(58) Field of Classification Search
USPC .......... 375/367, 267, 260, 299, 347, 349, 341
See application file for complete search history.

(56) References Cited

U.S. PATENT DOCUMENTS

| | | | |
|---|---|---|---|
| 6,785,341 | B2 | 8/2004 | Walton et al. |
| 7,120,199 | B2 | 10/2006 | Thielecke et al. |
| 7,289,770 | B2 | 10/2007 | Li et al. |
| 2006/0093058 | A1 | 5/2006 | Skraparlis |
| 2006/0193294 | A1 | 8/2006 | Jorswieck et al. |
| 2007/0041322 | A1 | 2/2007 | Choi et al. |
| 2007/0191066 | A1 | 8/2007 | Khojastepour et al. |
| 2007/0195908 | A1 | 8/2007 | Attar et al. |
| 2008/0056414 | A1* | 3/2008 | Kim et al. ..................... 375/347 |

(Continued)

OTHER PUBLICATIONS

"Spatial Multiplexing," http://en.wikipedia.org/wiki/Spatial_multiplexing, downloaded on Aug. 4, 2008, 2 pages.

(Continued)

*Primary Examiner* — Kabir A Timory
(74) *Attorney, Agent, or Firm* — Eschweiler & Associates, LLC

(57) ABSTRACT

A method of the multiple input multiple output feedback is disclosed. In accordance with an embodiment of the invention, the multiple input multiple output feedback method includes a receiver receiving a reference signal from a base station and calculating a signal to interference and noise ratio from the received reference signal. The method further includes determining a modulation and coding scheme based on the signal to interference and noise ratio and a receiver type.

14 Claims, 8 Drawing Sheets

(56) References Cited

U.S. PATENT DOCUMENTS

| | | |
|---|---|---|
| 2008/0069281 A1 | 3/2008 | Olesen et al. |
| 2008/0165875 A1 | 7/2008 | Mundarath et al. |
| 2009/0067528 A1 | 3/2009 | Loh et al. |

OTHER PUBLICATIONS

Samanta, R., et al.; "Codebook Adaptation for Quantized MIMO Beamforming Systems," Signals, Systems and Computers, 2005. Conference Record of the Thirty-Ninth Asilomar Conference on Digital Object Identifier, Oct. 28-Nov. 1, 2005; pp. 376-380.

Joung, J., et al.; "Capacity Evaluation of Various Multiuser MIMO Schemes in Downlink Cellular Environments," The 17th Annual IEEE International Symposium on Personal, Indoor and Mobile Radio Communications (PIMRC '06), IEEE 2006, 5 pages.

Katona, Z., et al.; "Proposal for Improving Link Adaptation Techniques in IPv6 Based Radio Access Networks," Mediterranean Microwaves Symposium; Athens, Greece; Sep. 6-8, 2005, CD-ROM, p. 1-4.

Catreux, S., et al.; "Adaptive Modulation and MIMO Coding for Broadband Wireless Data Networks," IEEE Communications Magazine, Jun. 2002, pp. 108-115.

Gesbert, D., et al.; "From Theory to Practice: An Overview of MIMO Space-Time Coded Wireless Systems," IEEE Journal on Selected Areas in Communications, vol. 21, No. 3, Apr. 2003, pp. 281-302.

Vu, M., et al.; "MIMO Wireless Linear Precoding;" IEEE Signal Processing Magazine, vol. 24, Issue 5, Sep. 2007, pp. 86-105.

Khaled, N., et al.; "Interpolation-Based Multi-Mode Precoding for MIMO-OFDM Systems with Limited Feedback"; IEEE Transactions on Wireless Communications, vol. 6, No. 3, Mar. 2007, pp. 1003-1013.

Nortel, "On the Need of Rank Adaptation for High Mobility UE," 3GPP TSG-RAN WG1#51bis, R1-080382, Sevilla, Spain; Jan. 14-18, 2008; pp. 1-6.

Nortel, "System Level Simulation of Adaptive MIMO for High Speed UE," 3GPP TSG-RAN WG1#51bis, R1-080383, Sevilla, Spain; Jan. 14-18, 2008, pp. 1-6.

Park, S., et al.; "UL Multiple Access in View of MIMO Support," IEEE C802.16m-08/086, IEEE 802.16 Broadband Wireless Access Working Group, Jan. 16, 2008, pp. 1-6.

"3GPP Long Term Evolution," http://en.wikipedia.org/wiki/3GPP_Long_Term_Evolution, downloaded on Feb. 11, 2008, 6 pages.

"3GPP Ultra-UTRAN Long Term Evolution (LTE) and 3GPP System Architecture Evolution (SAE)," http://www.3gpp.org/Highlights/LTE/LTE.htm downloaded on Feb. 11, 2008, 8 pages.

Non-Final Office Action dated Mar. 16, 2011 in connection with U.S. Appl. No. 12/186,368.

Final Office Action dated Aug. 31, 2011 in connection with U.S. Appl. No. 12/186,368.

Non-Final Office Action dated Feb. 24, 2012 in connection with U.S. Appl. No. 12/186,368.

Final Office Action dated Aug. 2, 2012 in connection with U.S. Appl. No. 12/186,368.

Non-Final Office Action dated Nov. 19, 2012 in connection with U.S. Appl. No. 12/186,368.

Final Office Action dated Mar. 29, 2013 in connection with U.S. Appl. No. 12/186,368.

Non-Final Office Action dated Sep. 12, 2013 in connection with U.S. Appl. No. 12/186,368.

Final Office Action dated Mar. 13, 2014 in connection with U.S. Appl. No. 12/186,368.

Notice of Allowance dated Jun. 3, 2014 in connection with U.S. Appl. No. 12/186,368.

\* cited by examiner

Figure 6a

| Curve | Transmission mode | modulation | Code rate | rank |
|---|---|---|---|---|
| 1 | SFBC + FSTD | 16QAM | 2/3 | 1 |
| 2 | WcDU | 16QAM | 2/3 | 1 |
| 3 | WcDU | QPSK | 2/3 | 2 |
| 4 | SFBC + FSTD | 64QAM | 8/9 | 1 |
| 5 | WcDU | 64QAM | 8/9 | 1 |
| 6 | WcDU | 16QAM | 2/3 | 2 |

ADAPTATION TECHNIQUES IN MIMO

This application is a continuation patent application of U.S. patent application Ser. No. 12/186,368 filed Aug. 5, 2008 in the name of Syed Aon Mujtaba, et al. entitled "Adaptation Techniques in MIMO" which claims the benefit of Provisional Patent Application Ser. No. 61/027,720, filed Feb. 11, 2008, and entitled "Procedures for Rank Adaptation in MIMO at High Vehicular Speeds," which application is hereby incorporated herein by reference in its entirety.

TECHNICAL FIELD

This invention relates generally to wireless communication systems, and more particularly to adaptation techniques in MIMO.

BACKGROUND

Multiple input multiple output (MIMO) is a radio communication technique in which both a transmitter and a receiver use multiple antennas to wirelessly communicate with one another. By using multiple antennas at the transmitter and receiver, the spatial dimension may be taken advantage of in a manner that improves overall performance of the wireless link.

MIMO may be performed as either an open loop or a closed loop technique. In open loop MIMO, a transmitter has no specific knowledge of the condition of the channel before signals are transmitted to a receiver. In closed loop MIMO, on the other hand, channel-related information is fed back from the receiver to the transmitter to allow the transmitter to precondition transmit signals before they are transmitted to better match the present channel state. However, at high vehicular speeds, the channel ages very fast, imposing significant challenges on the wireless communication system.

Hence, there is a general need for strategies to improve transmission in MIMO systems by adapting the link between the transmitter and the receiver.

SUMMARY OF THE INVENTION

These and other problems are generally solved or circumvented, and technical advantages are generally achieved, by embodiments of the present invention.

Embodiments of the invention include feedback methods for feedback in multiple input multiple output communication systems. In accordance with an embodiment of the invention, the multiple input multiple output feedback method comprises a receiver receiving a reference signal from a base station and calculating a signal to interference and noise ratio from the received reference signal. The method further comprises determining a modulation and coding scheme based on the signal to interference and noise ratio and a type of the receiver.

The foregoing has outlined rather broadly the features of an embodiment of the present invention in order that the detailed description of embodiments of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6a-6c, illustrates an application of embodiments of the invention in a MIMO communication system and illustrates the importance of the receiver type, wherein the user is moving at high vehicular speed relative to the base station.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Adaptation techniques adapt the transmission parameters to take advantage of prevailing channel conditions. The fundamental parameters to be adapted include rank, modulation and coding levels. Adaptation is a key solution to increase the spectral efficiency of wireless communication systems. Adaptation exploits the variations of the wireless channel (over time, frequency, and/or space) by dynamically adjusting certain key transmission parameters to the changing environmental and interference conditions observed between the base station (Node B) and the subscriber (user end UE).

In practical implementations, the values for the transmission parameters are quantized and grouped together as a set of modes. An example of such a set of modes includes a pairing of modulation level and coding rate. Since each such mode comprises a different data rate (expressed in bits per second) and robustness level (minimum signal-to noise ratio (SNR) needed to activate the mode)), they are optimal for use in different channel/link quality regions. A link adaptation algorithm selects the most efficient mode, over varying channel conditions, based, for example, on a mode selection criterion. Therefore, in poor channel conditions, modes are selected to enable communication thus rendering a robust system. Under good channel conditions, spectrally efficient modes are selected to increase throughput. Similarly, the link adaptation is sub-optimal under adverse conditions, such as if the receiver is moving at high vehicular speeds. Systems with no link adaptation or sub optimal link adaptation are constrained to use transmission modes designed to maintain acceptable performance when the channel quality is poor to get maximum coverage. Hence, these systems are effectively designed for the worst-case channel conditions, resulting in insufficient utilization of the full channel capacity.

Further, link adaptation is either unproven or incapable of robust operation under adverse environments, for example, under high vehicular speeds wherein the channel ages very rapidly. More specifically, the growing popularity of MIMO creates the need for link adaptation solutions in adverse environments that integrate temporal, spatial, and spectral components. By providing an improved feedback by including the receiver type, this sub-optimal link adaptation is offset in various embodiments. In various embodiments, the present invention establishes a technique for link adaptation that is robust, low in complexity and provides cost effective procedures for future wireless systems.

Figure 1:
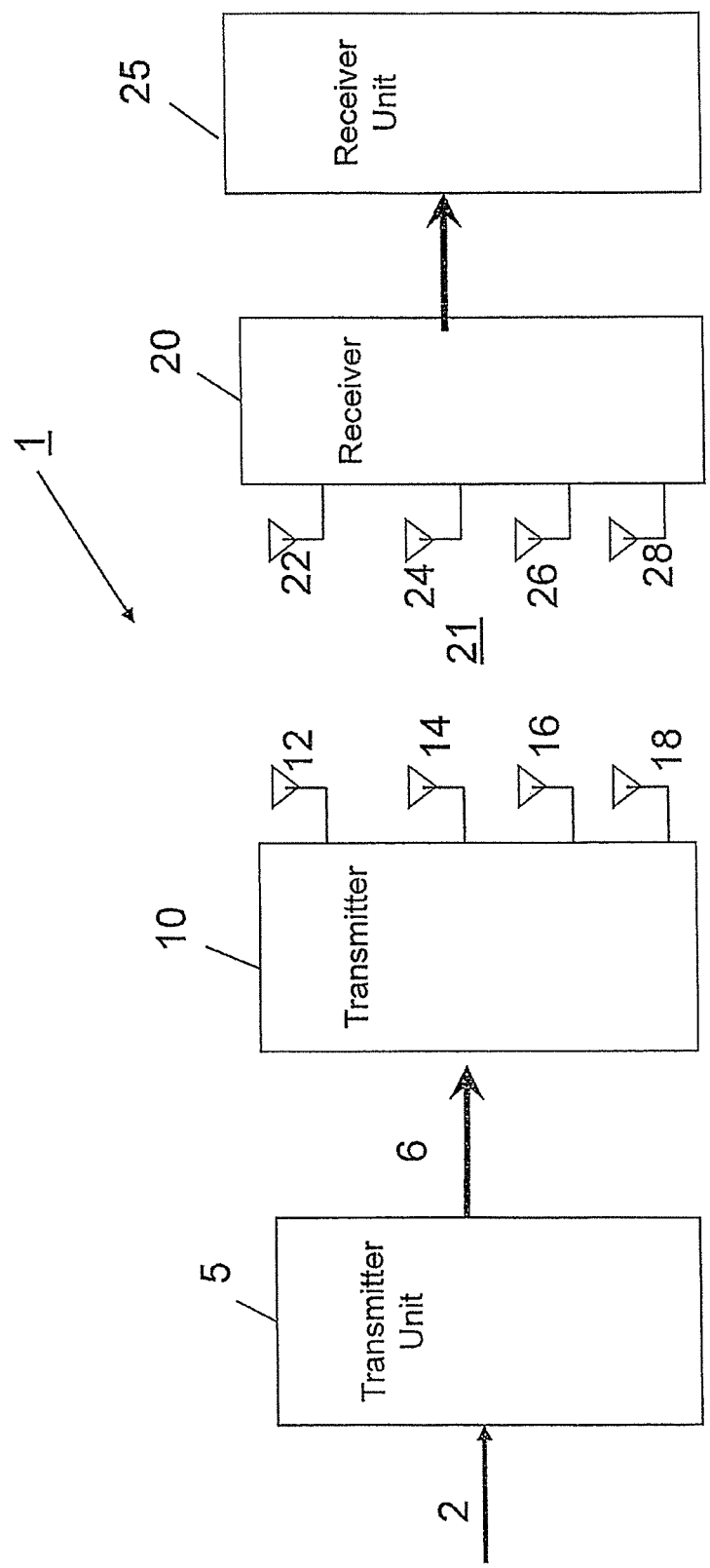
FIG. 1 is a block diagram illustrating a wireless communication system using a MIMO based wireless system, in accordance with an embodiment of the present invention.
Figure 2:
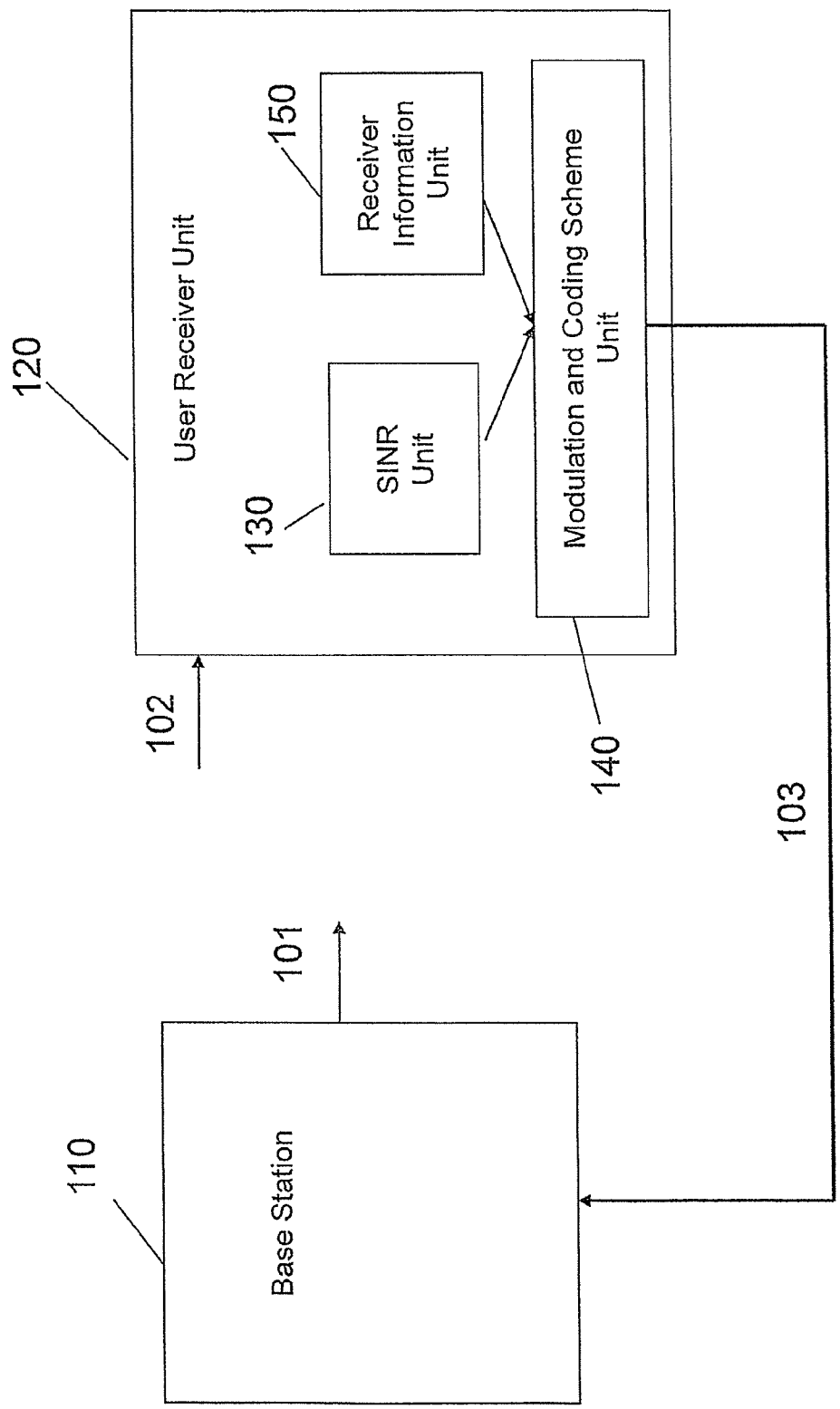
FIG. 2 illustrates a schematic of the link adaptation, in accordance with an embodiment of the present invention.

A wireless communication system using a MIMO based wireless system is first described using FIG. 1, in accordance with an embodiment of the present invention. An embodiment of the invention using the adaptation is illustrated in FIG. 2. Embodiments of the invention for closed and open loop MIMO are next described using FIGS. 4-5. Application of embodiments of the invention to illustrate the significance of the receiver type is described in FIG. 6.

FIG. 1 is a block diagram illustrating a wireless communication system using a MIMO based wireless system, in accordance with an embodiment of the invention. A compressed digital source in the form of a binary data stream 2 is fed to a simplified transmitting block 5 encompassing the functions of error control coding and (possibly joined with) mapping to complex modulation symbols. The simplified transmitting block 5 produces several separate symbol streams which range from independent to partially redundant to fully redundant. Each of the symbol streams is mapped to one of the multiple transmitter antennas 12-18. Mapping may include linear spatial weighting of the antenna elements or linear antenna space-time precoding. After upward frequency conversion, filtering and amplification, the transmitting signals 6 are launched into the wireless channel by the multiple transmitters 12-18. At the receiver 20, the signals are captured by possibly multiple antennas. Subsequently, demodulation and demapping operations are performed in a receiver unit 25 to recover the message. The level of intelligence, complexity, and a priori channel knowledge used in selecting the coding and antenna mapping algorithms are adapted by the receiver unit 25 during the link 1 depending on the application and the nature of the transmission.

The wireless transmitter 10 communicates with the receiver 20 via the wireless channel 21. The wireless transmitter 10 comprises four transmit antennas 12, 14, 16, and 18 and the receiver 20 comprises four receive antennas 22, 24, 26, and 28. In other embodiments, any number of transmit antennas and any number of receive antennas are used to form a MIMO channel. The wireless link 1 utilizes either closed loop or open loop MIMO techniques. The transmitter 10 dynamically tailors the transmit signals 6 to the channel in a manner that improves channel throughput or minimizes bit error rate or both. For example, a transmitted signal 6 is transmitted simultaneously through all the four transmit antennas 12, 14, 16, and 18 by decomposition into independent ¼ rate bit sequences. If the transmit signals 6 from each of the transmitters 12, 14, 16 and 18 into the channel are different from each other, there will be a four-fold increase in the channel capacity. If the transmit signals 6 from each of the transmitters 12, 14, 16 and 18 into the channel are identical, there will be four-fold increase in the diversity.

In various embodiments, the receiver 20 transmits channel-related feedback information to the transmitter 10 for use by the signal processing block 5 in developing transmit signals 6. The receiver 20 generates the feedback information by, for example, appropriately processing reference information received from the transmitter 10. In various embodiments, the receiver 20 combines the reference information generated by the transmitter with knowledge of the receiver's type and characteristics in generating the feedback information. In one embodiment, for example, the present invention solves the problem of sub-optimal link adaptation by taking the receiver type into consideration. Different types of receivers perceive a different channel quality. Hence, in various embodiments, the present invention includes the type of receiver in defining the channel quality.

In various embodiments, the receiver comprises a linear receiver or a non-linear receiver. For example, a linear receiver can be a MMSE (minimum mean square error) in one embodiment. Similarly, a non-liner receiver comprises an ML (maximum likelihood), or some other variant, in various embodiments.

Assuming that there are $M_t$ antennas at the transmitter 10 and $M_r$ antennas at a receiver 20, there are $M_t \times M_r$ MIMO channels between the transmitter 10 and the receiver 20. Let Y denote the signal received by antenna 22 on the receiver 20, X the signal transmitted by the transmitter 20, and V the channel noise received by antenna 22 on the receiver 20. The received signal Y is represented as:

$$Y = HX + V, \qquad (1)$$

where H is the channel matrix observed by the signal in the wireless medium 21.

Channel matrix H, in turn, determines the performance of the MIMO network. In wireless systems, the channel is typically random, i.e., H is a random matrix. Common random matrix models for channels include uncorrelated Rayleigh fading (i.e. the entries of H are independent and identically distributed complex normal random variables), correlated Rayleigh fading, uncorrelated Rician fading, and correlated Rician fading.

The correlations among the signals received by the receiving antennas depend on the channel conditions and the degree of correlations determines the rank of channel matrix H. The rank R of the MIMO channel is the number of independent equations offered by the above mentioned linear system. It is also equal to the algebraic rank of the channel matrix H. Hence, the rank is always both less than the number of antennas on the transmitter 10 and less than the number of antennas on the receiver 20. Consequently, the number of independent signals that safely transmits through the MIMO system is at most equal to the rank.

In an environment with severe multipath effects, the signals received by every receiver antenna 22, 24, 26, and 28 on the receiver 20 are highly uncorrelated. Consequently, MIMO channel matrix H has a high rank. In a good environment, for example, if the receiver 20 is in the Line-Of-Sight (LOS) range, the signals received by every receiver antenna 22, 24, 26, and 28 on the receiver 20 are highly correlated. As a result, MIMO channel matrix H has a lower rank. The lowest rank for channel matrix H is one wherein all signals received by different antennas are correlated.

Improvements in performance of the MIMO network demand a channel matrix H with a high rank, and good signal to noise ratio. Both the number of transmitted streams and the bit error rate on each stream determine the link's efficiency (error free fraction of the conventional physical layer throughput per transmitter antenna times number of transmitting antennas) rather than just the number of independent input streams. Since the use of coding on the multi-antenna signals (space-time coding) has a critical effect on the bit error rate behavior, it becomes an important component of MIMO design. In various embodiments, the error rate is reduced by improved modeling of the wireless communication systems. The receiver 20 feeds back to the transmitter 10 information not only regarding the wireless channel 21, but also information regarding the receiver and/or subsequent processing such as decoding, etc. Including such detailed information regarding the receiver 20 allows an improved tradeoff between coding and multiplexing, thus maximizing the throughput rate of the wireless communication system.

A schematic of the link adaptation process is illustrated in FIG. 2, in accordance with an embodiment of the present invention. This example provides user end (UE) procedures in support of link adaptation in 3GPP-LTE. 3GPP LTE (Long Term Evolution) is the name given to a project within the Third Generation Partnership Project to improve the Universal Mobile Telecommunications System (UMTS) to cope with future requirements.

FIG. 2 illustrates a schematic embodiment of a wireless communication system that utilizes aspects of the present invention. A base station (Node B) 110 communicates with user equipment or user unit receiver 120, which may be a mobile telephone, computer, laptop, hand held device, or other such device. As illustrated in FIG. 2, the Node B 110 sends reference signal 101 to the user unit receiver 120. The user unit receiver 120 estimates the channel information through the reference signal 101 sent by Node B 110. The user unit receiver 120 generates a feedback signal 103, for example, by appropriately processing the received reference signal 102. The feedback signal 103 comprises modulation and coding scheme and rank. If a closed loop feedback is used, the feedback signal 103 also comprises precoding matrix indices. The user unit receiver 120 performs a signal to interference and noise ratio (SINR) 130 calculation. Subsequently, the user unit receiver 120 uses this signal to interference and noise ratio (SINR) 130 along with the receiver information 150 (e.g., type of receiver) to generate a modulation and coding scheme 140. A modulation and coding scheme 140 thus generated is thus adapted to enhance the throughput of the channel for the given characteristics of the receiver. Examples of modulation schemes include quaternary PSK (QPSK), 16-quadrature amplitude modulation (16QAM), 64-quadrature amplitude modulation (64QAM), binary phase shift keying (BPSK), etc. However, in some embodiments, the feedback information 103 may comprise intermediate state information, for example, SINR and receiver type that can be processed, for example, by the base station to yield a rank and modulation and coding scheme.

In various embodiments, if the signaling protocol specifies that rank and MCS are to be fed back to the base station, the user unit receiver 120 selects the rank and MCS based on SINR and the receiver type. If the receiver type is not known to the base station, the base station should not override the user unit receiver 120 recommendation, or else the base station runs the risk of sub-optimal link adaptation. Or, for example, if the user unit receiver 120 is only expected to feedback SINR to the base station, then the base station should know the receiver type through signaling. In some embodiments, the receiver types are agreed upon a priori. In other words, the idea behind various embodiments of the invention is the use of SINR and receiver type to guide link adaptation, rather than SINR only.

In various embodiments, the signal to interference and noise ratio 130 calculation, the receiver information 150, and the modulation and coding scheme 140 are added as additional code or by modifying existing code, for example, by suitable modification of the firmware (software) of the user unit receiver 120. In some embodiments, some or all of the functionality requires separate hardware inside the user unit receiver 120.

Figure 3:
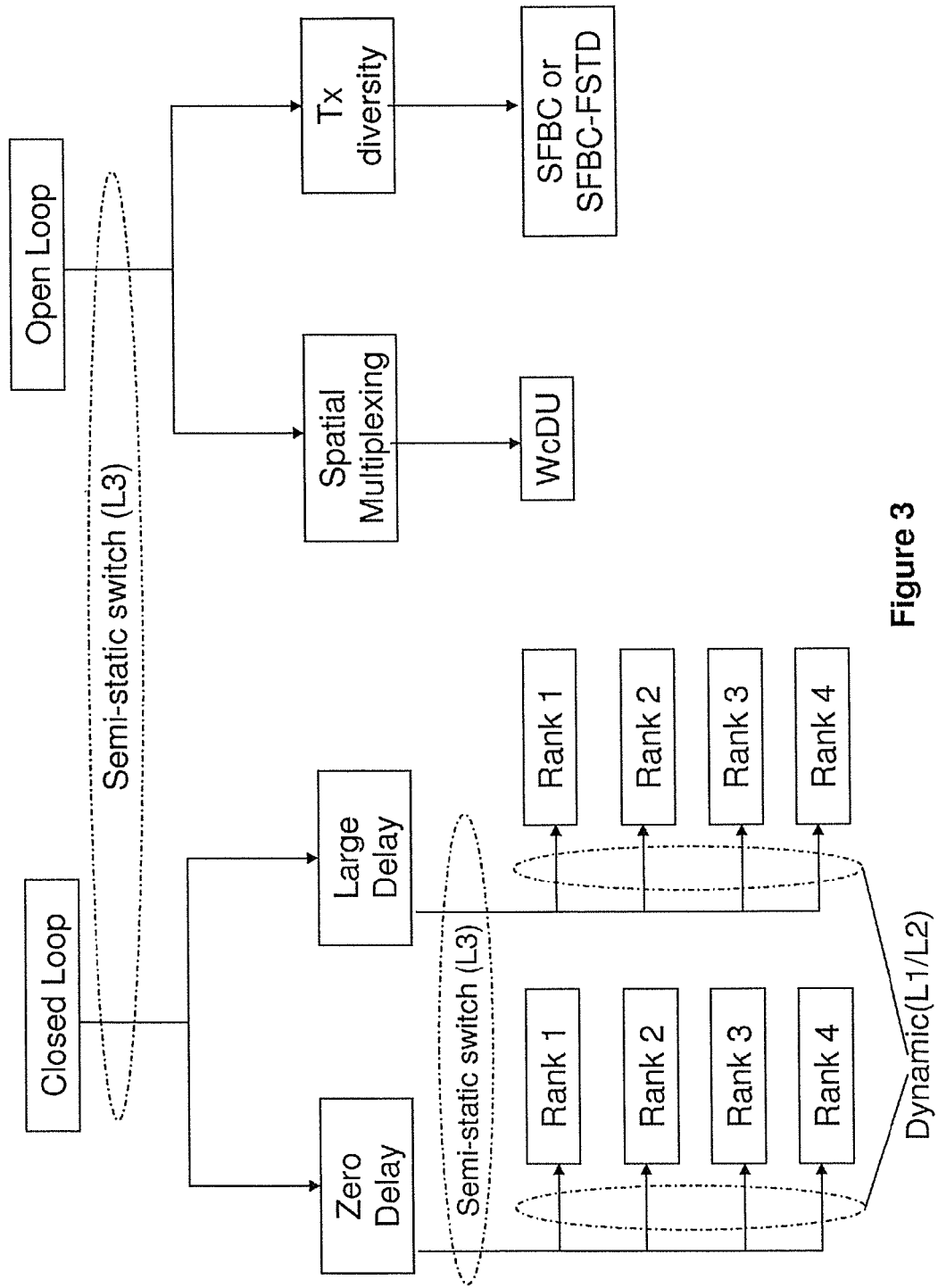
FIG. 3 illustrates 3GPP-LTE MIMO modes used in various embodiments of the present invention.

FIG. 3 illustrates 3GPP-LTE MIMO modes used in embodiments of the present invention. The user unit receiver 120 is configured by Node-B 110 for different MIMO modes. The MIMO modes supported include both transmit diversity and spatial multiplexing modes. Transmit diversity is achieved by using space-time codes that introduce temporal and spatial correlation into signals transmitted from different antennas in order to provide diversity at the receiver, and coding gain over an uncoded system without impairing bandwidth efficiency. Transmit diversity is used to offset transmission loss effects including effects arising from fading during the propagation in the channel. Examples of transmit diversity coding include space frequency block coding (SFBC), space time block coding (STBC), space-time trellis coding (STTC). In spatial multiplexing, a signal is divided into multiple layers or streams, and transmitted in parallel, increasing the throughput of the transmission. In various embodiments, the standard modes supported in 3GPP-LTE are used, although in other embodiments more or less transmission modes are used.

In one embodiment, the MIMO modes in closed loop transmission comprise two modes: a zero delay mode and a large delay mode. Each mode is dynamically configured and assigned a coding scheme based on the rank of the transmission. Closed loop MIMO in various embodiments comprises two modes: a spatial multiplexing mode (e.g., WcDU) and a transmit diversity mode. The transmit diversity mode uses either space frequency block coding (SFBC) or SFBC and frequency switched transmit diversity (FSTD). These modes are semi-statically configured and signaled by Layer-3 (L3) signaling. As the transmitters are fixed, the vehicular speed of the receiver defines the delay, and thus the ageing of the channel state information. To improve the performance of an open loop transmission, a cyclic precoding matrix index scheme may be used that cyclically selects a codeword.

Figure 4:
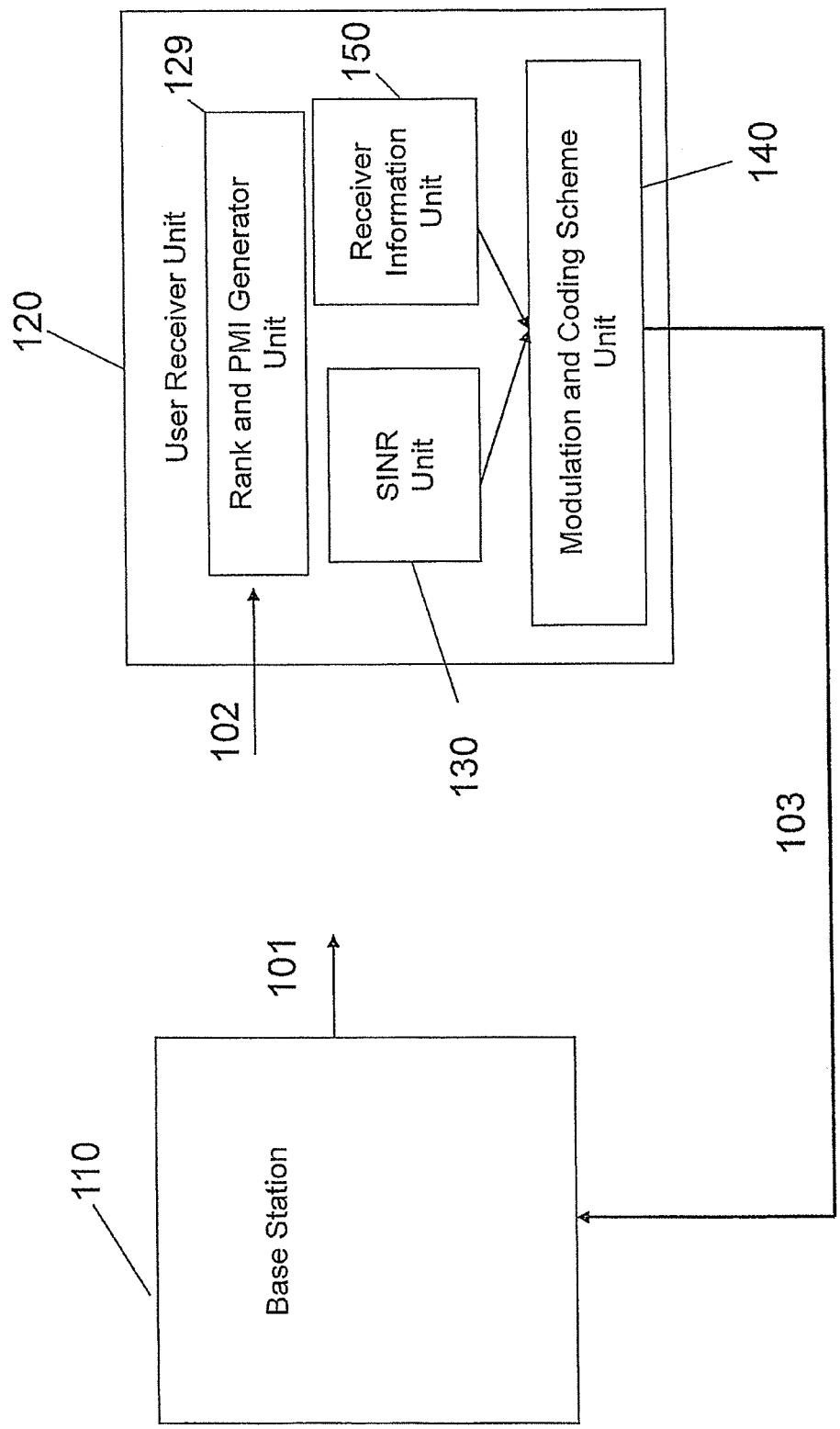
FIG. 4 illustrates an embodiment of the invention applied to closed loop MIMO systems.
Figure 5:
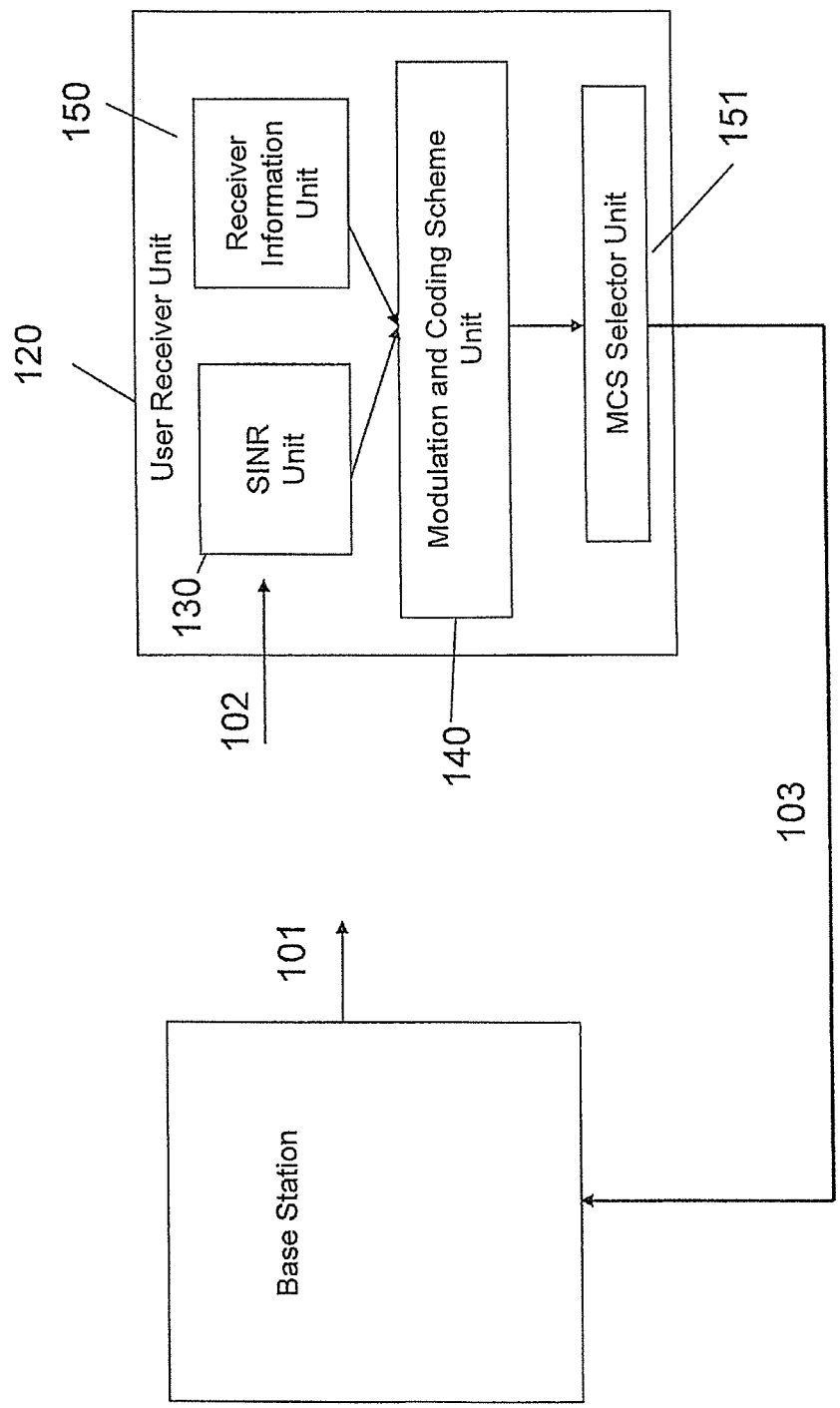
FIG. 5 illustrates an embodiment of the invention applied to open loop MIMO systems.

The UE feedback procedure for closed loop will now be described. FIG. 4 illustrates an embodiment of the invention applied to closed loop MIMO systems. Closed-loop MIMO comprises optimizing MIMO networks using channel state information at the transmitter to customize the transmitted waveforms to provide higher link capacity and throughput. Closed-loop MIMO enables channel-aware scheduling for multiple users, and simplifies multi-user receivers by avoiding interference, and provides a simple and general means to exploit spatial diversity. A consequence of using multiple antennas, however, is an increase in the number of channel state parameters. Channel state information needs to be quantized and sent to the transmitter over a limited-rate feedback channel.

In closed MIMO, single-user linearly precoded space-time block codes are described by the input/output relationship:

$$Y=HFS+V, \quad (2)$$

where, F is an $M_t \times M$ precoding matrix, S is an $M \times T$ space-time block codeword, and V is an $M_r \times T$ noise matrix. The precoder parameter M is chosen so that $M \leq M_t$. The space-time block codeword S (whether it be spatial multiplexing, orthogonal space-time block coding, etc.) is generated independent of the channel. The precoder is chosen using a function $f$ that maps an $M_r \times M_t$ channel realization to an $M_t \times M$ precoding matrix with F=f(H). The precoding matrix F adapts the transmitted signal to the current channel conditions. In MIMO, the optimal choice of the precoding matrix F is the right singular vectors of the channel matrix H.

Referring to FIG. 4, a transmitter Node B 110 transmits a reference signal 101 to the user receiver 120. A rank and PMI generator 129 in the user end receiver 120 observes a channel realization by sampling a received reference signal 102, to select the best precoding matrix F to be used at the moment. For computational efficiency and to minimize feedback complexity, the precoding matrix F may be stored as a precoding matrix index. The precoding matrix index indicates the index of an element that is closest to the precoding matrix F in a predefined array of matrices.

In various embodiments, the user end receiver 120 comprises a receiver type, for example, a non-linear maximum likelihood (ML) or a linear minimum mean square error (MMSE) receiver. Maximum likelihood receivers require the user end receiver 120 to consider all possible precoding matrix F (or precoding matrix index) before making the decision, and hence can be computationally expensive. The linear minimum mean square error, although sub-optimal, is simpler. For example, for the minimum mean square error receiver, the mean square error at the output of the user end receiver 120 is a function of the precoding matrix F used at the transmitter Node B 110.

Using the precoding matrix F (or precoding matrix index), the channel quality for each layer is determined. Typically, channel state information (CSI) is measured using signal to interference and noise ratio (SINR). As the precoding matrix F is available, the SINR calculated is the instantaneous signal to noise ratio for each spatial layer. For example, in a minimum mean square error receiver, a weighted mean square error design, giving different weights to different received signal streams yields different criteria, such as maximum rate and SINR for each layer.

The user end receiver 120 comprises an MCS generator that utilizes the SINR and type of user end receiver 120 to select a modulation and coding scheme (MCS), e.g., $MCS=f_{receiver\_type}(SINR)$, where $f_{receiver\_type}$ is a lookup table that maps SINR to MCS for each layer. In various embodiments, for each type of user end receiver 120, the MCS generator comprises a mapping of SINR against MCS for each layer. Different MCS schemes have different bit or frame error rates at the same SINR. Hence, for a given SINR, a MCS scheme is adopted that is within a particular error rate while maximizing throughput. Hence, the MCS scheme selected for the same SINR and layer can be different for two different types of receiver. Similarly, in different embodiments, the look up table comprises other properties of a receiver. In various embodiments, the SINR estimation may be impacted by channel estimation algorithm. For example, the averaging schemes used to calculate PMI and MCS are performed over a group of sub-carriers and hence impact the SINR estimation.

The MCS scheme, rank and precoding matrix F (e.g. codebook) are sent back as feedback information 103 through the designated feedback channel to the transmitter. Transmitting the precoding matrix F, although accurate, can take up valuable bandwidth. Instead, there are two main approaches to designing feedback: quantizing the channel or quantizing properties of the transmitted signal. A vector quantizer works by mapping a real or complex valued vector into one of a finite number of vector realizations. The mapping is designed to minimize some sort of distortion function such as the average mean squared error (MSE) between the input vector and the quantized vector. Alternately, quantized information needed to adapt the transmitted signal to current channel condition is used. In such techniques, a codebook comprising a set of matrices is first generated.

Hence, the best precoding matrix F is stored as an index of the optimal codeword to save bandwidth, so that only the codeword is transmitted. The user end receiver 120 sends a feedback signal 103 to the transmitter Node B 110. The feedback signal 103 comprises feedback information such as the rank, modulation and coding schemes, and the precoding matrix index. The transmitter Node B 110 uses the feedback information, for example, the precoding matrix index, to generate a precoding matrix F. The transmitter Node B 110 applies the feedback information in the feedback signal 103 to the subsequent transmitted signal. In various embodiments, the transmitter Node B 110 does not override the rank or precoding matrix indices selected by the user end receiver 120.

An open loop UE feedback procedure will now be described. The closed loop precoding scheme works well for low mobility user ends where the channel variation is slow. However, the performance of closed loop precoding schemes degrades rapidly with an increase in user end mobility. For medium and high mobility user ends, open loop schemes may be more preferred. Medium mobility refers to user end velocities greater than about 30 km/hr. Unlike closed loop schemes, in open loop schemes there is no feedback of channel state information.

In this procedure, the user end calculates the average SINR 130 based on the estimated channel information. Unlike closed loop schemes, valid channel information is not available in open loop schemes. Hence, in contrast to closed loop schemes, in open loop schemes, the SINR 130 is a frequency, time and spatial average per receiver antenna. Transmitter Node B 110 transmits a reference signal 101 into the channel. Based on a received reference signal 102, the user end receiver 120 estimates the channel and calculates the effective SINRs for each rank. In the absence of a channel matrix, in open loop schemes, the rank is the number of independent data streams. This is unlike a closed loop scheme where the rank is the numerical rank of the matrix.

The rank and modulation and coding scheme 140 are selected together based on the average SINR. The user end receiver 120 calculates the modulation and coding schemes 140 for each transmission and for each rank ($MCS_{rank}$) according to the average SINR 130 and receiver information 150, e.g., $MCS_{rank}=f_{receiver\_type}^{rank}(SINR)$. In different embodiments, the $MCS_{rank}$ is calculated from a table look up that comprises average SINR, rank and receiver type. A single MCS and rank are selected that maximizes data through put rate. In various embodiments, an MCS selector 151 at the user end receiver 120 selects the single MCS and rank that maximize the throughput rate as:

$$\text{Throughput}=\text{rank}\times MCS_{rank}.$$

The user end receiver 120 feedbacks the rank of the transmission to transmitter Node B 110 along with the average SINR calculated for that rank. In various embodiments, the throughput rate of the wireless system increases relative to a sub-optimal link adaptation scheme that does not use adaptation based on receiver type. The increase in time delay at high vehicular speeds can be partially offset by a reduction in the transmission delay, effectively improving the quality of the communication despite the fast channel ageing.

Figure 6B:
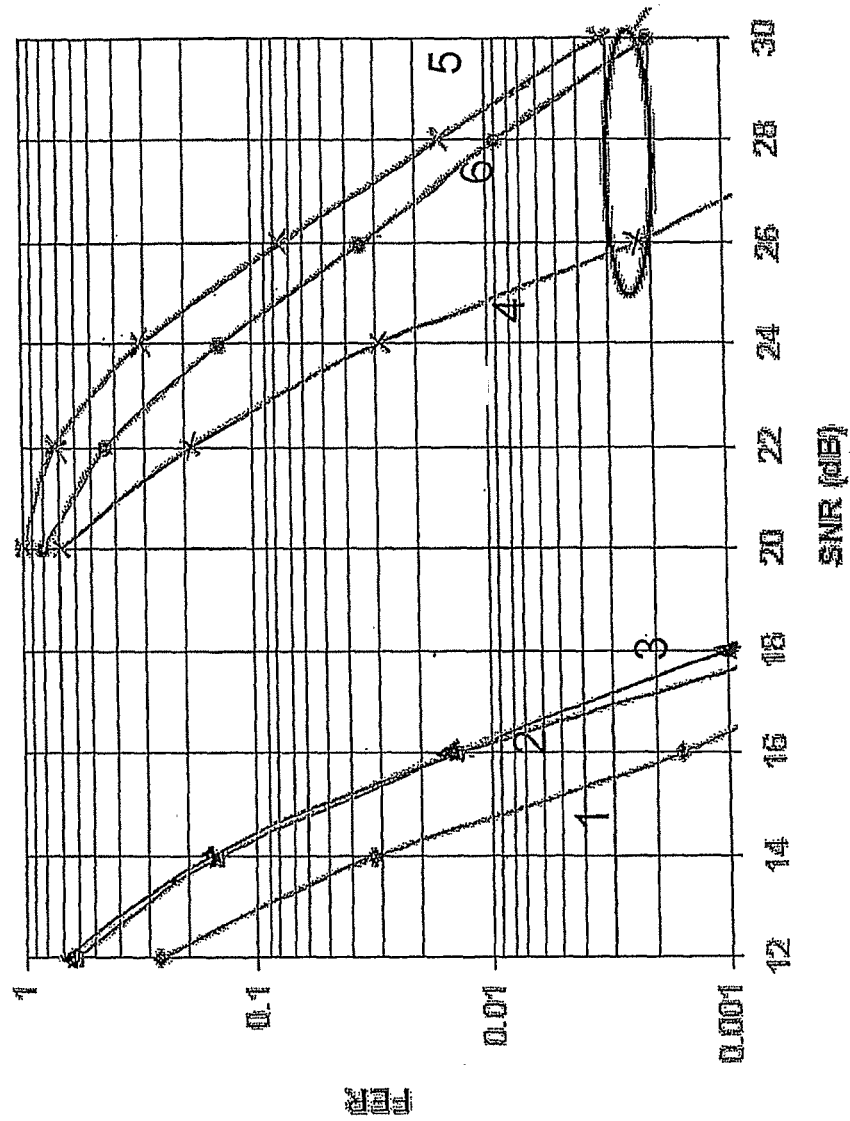
Figure 6C:
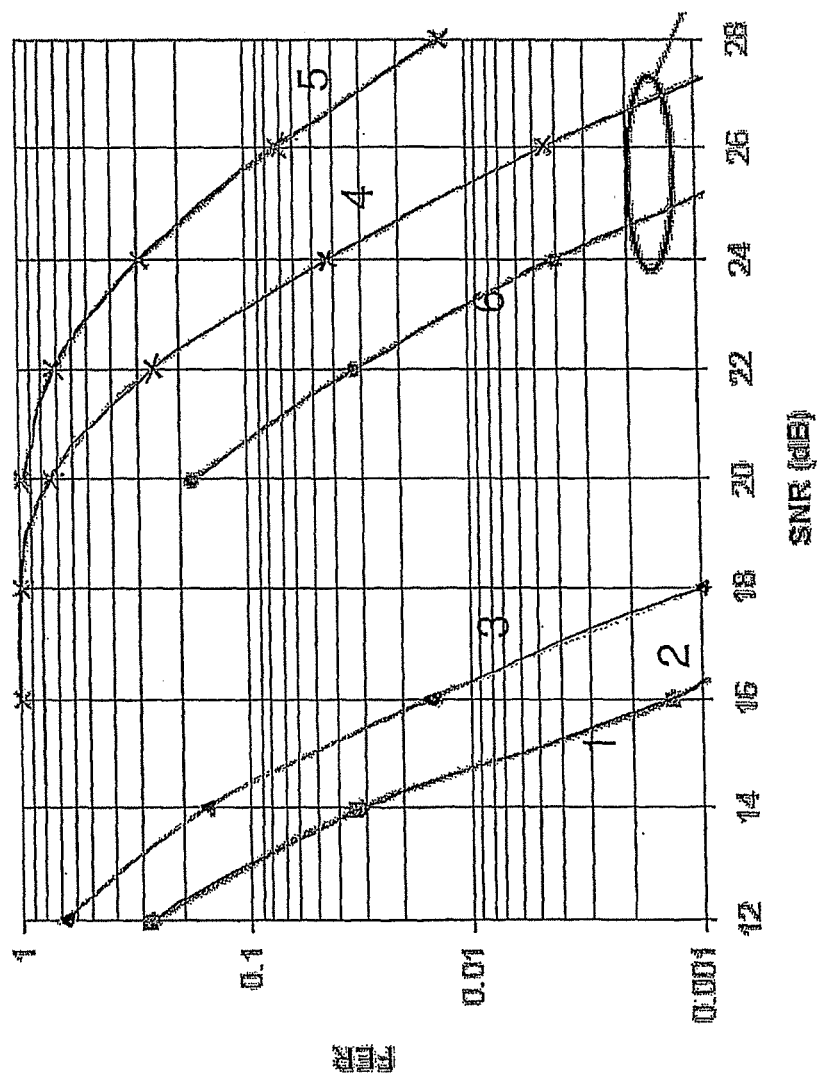

FIGS. 6a, 6b and 6c illustrate the performance of a system that utilizes embodiments of the present invention. FIG. 6a illustrates the transmission schemes plotted in FIGS. 6b and 6c, FIG. 6b illustrates the performance of MIMO modes with a minimum mean square error receiver. FIG. 6c illustrates the performance of MIMO modes with a maximum likelihood receiver.

FIG. 6a tabulates the various transmission schemes used in the simulations of FIGS. 6b and 6c. Each of the simulated transmission scheme is tabulated as a curve that corresponds to the curves on FIGS. 6b and 6c. Referring to FIG. 6b, the frame error rate plotted against SINR for varying MCS schemes for a minimum mean square error receiver. The simulations assume ideal channel information using a SCM channel model for a UE traveling at high vehicular speeds (120 km/h). As illustrated in FIG. 6b, curve 4 illustrating a rank-1 transmission using space frequency block coding SFBC and frequency switched transmit diversity SFBC performs better than curve 6 illustrating a rank-2 transmission using WcDU.

However, in contrast, similar simulations for a maximum likelihood receiver yield the opposite result. In the particular case studied in FIG. 6c, at high vehicular speeds, for the ML receiver, curve 6 the rank-2 transmission using WcDU out performs any rank-1 transmission using SFBC-FSTD coding; for example, see curve 4 in FIG. 6c. Hence, a wireless communication system transmitting without the knowledge of the receiver performs sub-optimally.

Although embodiments of the present invention and their advantages have been described in detail, it should be understood that various changes, substitutions and alterations can be made herein without departing from the spirit and scope of the invention as defined by the appended claims. For example, it will be readily understood by those skilled in the art that many of the features, functions, processes, and materials described herein may be varied while remaining within the scope of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system for link adaptation in MIMO systems, comprising:
    a receiver circuit of a linear receiver type or a non-linear receiver type;
    a plurality of antenna ports configured to couple to a plurality of antennas, respectively, and to receive signals thereat, wherein the receiver circuit is configured to determine a signal to interference and noise ratio (SINR) of one or more received signals;
    a determiner logic configured to determine a mapping of signal to interference and noise ratio (SINR) to modulation and coding scheme (MCS), wherein the mapping is dependent on the receiver type of the receiver, wherein for at least one SINR the MCS for a linear receiver type is different than the MCS for a non-linear receiver type; and
    a selection logic configured to select a modulation and coding scheme (MCS).

2. The system of claim 1, where the linear receiver type is a minimum mean square error (MMSE) receiver.

3. The system of claim 1, where the non-linear receiver type is a maximum likelihood (ML) receiver.

4. The system of claim 1, where the receiver circuit is located in a user equipment (UE).

5. The system of claim 1, where the receiver circuit is located in a base station.

6. The system of claim 1, where the determiner logic is located in a UE.

7. The system of claim 1, where the determiner logic is located in a base station.

8. The system of claim 1, where the modulation and coding scheme (MCS) is one of QPSK, 16QAM, 64QAM, BPSK.

9. The system of claim 1, where the receiver circuit comprises at least two receiver types.

10. The system of claim 1, where the signal to interference and noise ratio (SINR) information and the receiver type information are transmitted via channel state information or channel quality information.

11. The system of claim 9, where the channel state information includes rank information.

12. The system of claim 1, where the received signals include reference signals.

13. A system for link adaptation in MIMO systems, comprising:
    a receiver circuit of a linear receiver type or a non-linear receiver type;
    a plurality of antenna ports configured to couple to a plurality of antennas, respectively, and configured to receive signals thereat, wherein the receiver circuit is configured to determine at least one signal to interference and noise ratio (SINR) of received signals; and
    a selection logic configured to select a modulation and coding scheme (MCS) based on a mapping of signal to interference and noise ratio (SINR) to modulation and coding scheme (MCS), wherein the mapping is dependent on the receiver type of the receiver, wherein for at least one SINR the MCS for a linear receiver type is different than the MCS for a non-linear receiver type.

14. A system for link adaptation in MIMO systems, comprising:
    a receiver means of a linear receiver type or a non-linear receiver type;
    a plurality of antenna ports configured to couple to a plurality of antennas, respectively, and configured to receive signals thereat, wherein the receiver means is operable for determining at least one signal to interference and noise ratio (SINR) of received signals; and
    a selection means for selecting a modulation and coding scheme (MCS) based on a mapping of signal to interference and noise ratio (SINR) to modulation and coding scheme (MCS), wherein the mapping is dependent on the receiver type of the receiver, wherein for at least one SINR the MCS for a linear receiver type is different than the MCS for a non-linear receiver type.

\* \* \* \* \*